United States Patent

[11] 3,627,059

[72] Inventors William Wayne Jackson;
Richard Wayne Hook, both of Des Moines, Iowa
[21] Appl. No. 887,126
[22] Filed Dec. 22, 1969
[45] Patented Dec. 14, 1971
[73] Assignee Deere & Company
Moline, Ill.

[54] GAUGE WHEEL ASSEMBLY FOR AGRICULTURAL IMPLEMENTS
10 Claims, 4 Drawing Figs.

[52] U.S. Cl. .................................................. 172/413,
172/417, 172/439, 172/668, 280/43.23
[51] Int. Cl. .................................................. A01b 63/22
[50] Field of Search ........................................... 172/413,
417, 212, 450, 439, 294, 414, 418; 280/43.23

[56] References Cited
UNITED STATES PATENTS

| | | | |
|---|---|---|---|
| 3,358,777 | 12/1967 | Groenke............. | 172/417 |
| 3,503,453 | 3/1970 | Johannsen et al. .......... | 172/212 |
| 3,065,803 | 11/1962 | Pierson............. | 172/413 |
| 3,486,761 | 12/1969 | Fay............. | 280/43.23 |
| 3,356,382 | 12/1967 | Fay............. | 280/43.23 |
| 3,223,177 | 12/1965 | Van Der Lely .......... | 172/450 X |
| 2,775,179 | 12/1956 | Chambers et al. .......... | 172/439 |
| 2,830,519 | 4/1958 | Chandler et al. .......... | 172/294 X |
| 1,085,298 | 1/1914 | Rideout........... | 172/294 |
| 3,228,484 | 1/1966 | Arnold et al........... | 172/417 X |
| 2,985,246 | 5/1961 | Shipp........... | 172/417 X |

Primary Examiner—Robert E. Pulfrey
Assistant Examiner—R. T. Radar
Attorneys—H. V. Harsha, Harold M. Knoth, William A. Murray, John M. Nolan and R. L. Hollister ABSTRACT: A flexible agricultural implement has a center frame mounted on a tractor three-point hitch and a pair of outrigger frames pivotally connected to the center frame for independent vertical pivotal movement relative to the center frame. The outrigger frame ends are raised and lowered by vertically adjustable gauge wheel assemblies which are operated by extensible and retractable hydraulic cylinders. The hydraulic cylinders for the gauge wheel assemblies are connected in series with each other and in series with the tractor rockshaft cylinder. The linkage of the gauge wheel assemblies is such that a single-size wheel assembly is compatible with several sizes of tractor rockshaft cylinders, and when attaching the implement to a different size tractor, only a single pin in each gauge wheel assembly needs to be repositioned to alter the location of one of the cylinder anchors. The cylinders on the wheel assemblies are large enough not to limit the stroke of the largest tractor rockshaft cylinder with which they are intended to be used, and when used with a smaller tractor rockshaft cylinder, only a portion of the stroke of the cylinders on the gauge wheel assemblies is used.

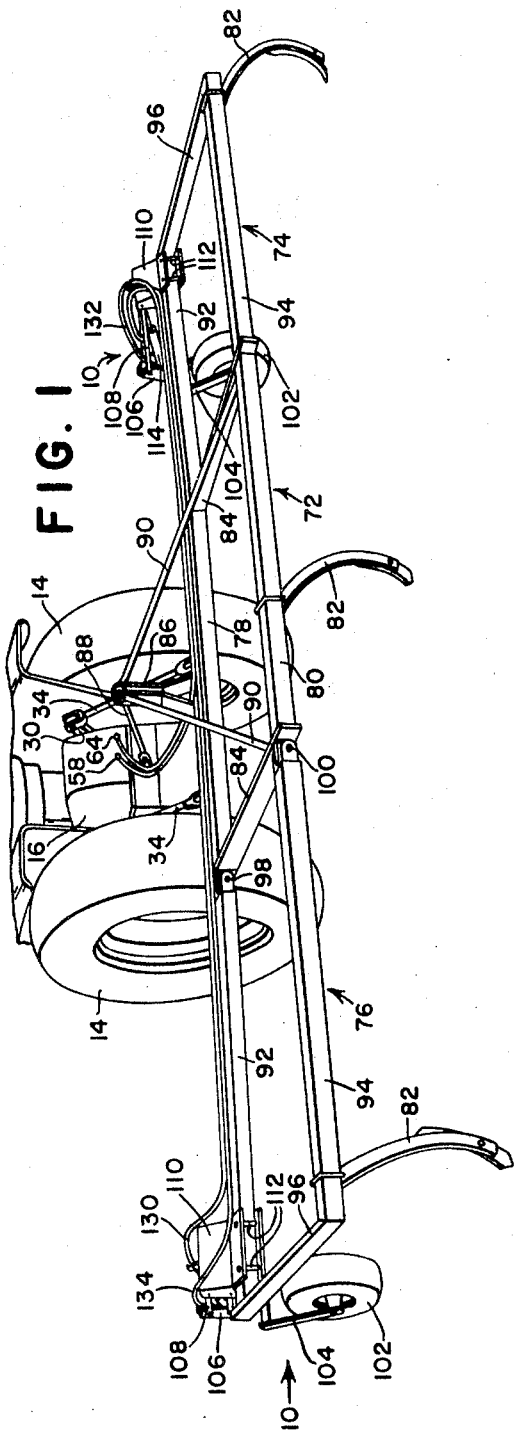
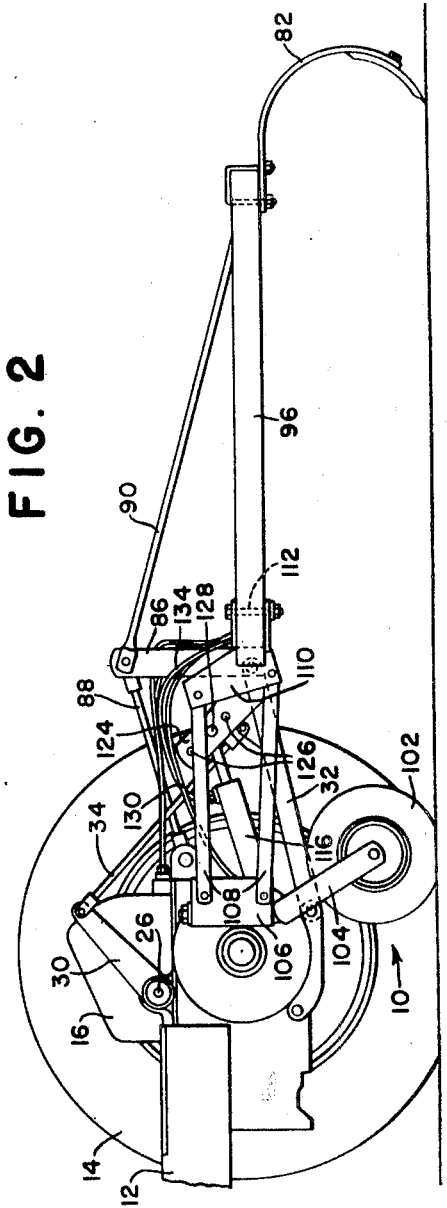

INVENTORS
W. W. JACKSON
R. W. HOOK

GAUGE WHEEL ASSEMBLY FOR AGRICULTURAL IMPLEMENTS

BACKGROUND OF THE INVENTION

The present invention relates generally to agricultural implements, and more particularly relates to an improved gauge wheel assembly for agricultural implements.

In copending U.S. application Ser. No. 819,649 filed Apr. 28, 1969, there is disclosed and claimed a flexible agricultural implement having a center section connected to a tractor three-point hitch for raising and lowering movement therewith and a pair of outrigger frames pivotally connected to the center frame for independent vertical pivotal movement. The outrigger frames are raised and lowered by adjustable gauge wheel assemblies which are controlled by extensible and retractable hydraulic cylinders. The hydraulic cylinders on the gauge wheel assemblies are connected in series with each other and in series with the tractor rockshaft cylinder. The arrangement disclosed in the copending application increases the lift capacity of a tractor, permits the use of wider integral implements, permits wide integral implements to follow the ground contour, and retains full draft control of the entire implement.

However, in order for the various frames of the implement disclosed in the aforementioned U.S. application to be vertically adjusted through equal vertical distances, it is necessary that the displacement of the cylinders for the gauge wheel assemblies be matched with the displacement of the tractor rockshaft cylinder and the linkage of the gauge wheel assemblies be matched with the linkage of the tractor three-point hitch. Thus, if the implement was to be used with various size tractors, it was necessary to provide various sizes of interchangeable gauge wheel assemblies having various sizes of cylinders.

SUMMARY OF THE INVENTION

The principle object of the present invention is to provide an adjustable gauge wheel assembly which is controlled by an extensible and retractable hydraulic cylinder and which includes a simple adjustment for varying the length of the stroke of the cylinder needed to adjust the gauge wheel assembly a given amount.

An additional object of the invention is to provide an adjustable gauge wheel assembly for an agricultural implement which is adapted to be connected to a tractor three-point hitch, the gauge wheel assembly being operable by an extensible and retractable hydraulic cylinder which is adapted to be connected in series with the rockshaft cylinder for the tractor three-point hitch, and which gauge wheel assembly includes a simple adjustment for the mounting of the cylinder which allows the use of the gauge wheel assembly with various sizes of tractors having various sizes of rockshaft cylinders.

A further object of the invention is to provide an adjustable gauge wheel assembly for an agricultural implement which is adapted to be connected to a tractor three-point hitch, the gauge wheel assembly being operable by an extensible and retractable hydraulic cylinder which is adapted to be connected in series with the rockshaft cylinder for the tractor three-point hitch, and which gauge wheel assembly includes a simple adjustment for the mounting of the cylinder which allows the use of a single size gauge wheel assembly with tractors having three-point hitches of various sizes and linkage geometry.

Another object of the invention is to provide a gauge wheel assembly which is adapted to be used on an agricultural implement of the type which is mounted on a tractor three-point hitch, the gauge wheel assembly being controlled by an extensible and retractable hydraulic cylinder adapted to be connected in series with the tractor hydraulic cylinder controlling the three-point hitch so that the tractor hitch and gauge wheel assembly work simultaneously to vary the height of the implement, and which gauge wheel assembly includes means to vary the length of the cylinder stroke needed to vertically adjust the implement through a given distance whereby the volume displacement of the gauge wheel assembly cylinder for a given vertical movement of the implement can be matched with the volume displacement of the tractor cylinder for the same vertical movement of the implement.

Yet another object of the invention is to provide a gauge wheel assembly which is adapted to be used on an agricultural implement of the type which is mounted on a tractor three-point hitch, the gauge wheel assembly being controlled by an extensible and retractable hydraulic cylinder adapted to be connected in series with the tractor hydraulic cylinder controlling the three-point hitch so that the tractor hitch and gauge wheel assembly work simultaneously to vary the height of the implement, and which gauge wheel assembly includes means to vary the mounting of the cylinder to compensate for tractors having different sizes of hydraulic cylinders and different hitch geometries so that a single size gauge wheel assembly is compatible with several sizes of tractor rockshaft cylinders and respective hitch geometries.

The above objects and additional objects and advantages of the invention will become apparent from a reading of the following detailed description of a preferred embodiment of the invention when taken in conjunction with the accompanying drawings.

BRIEF DESCRIPTION OF THE DRAWINGS

In the drawings:

FIG. 1 is a perspective view of a tractor-implement combination in which the implement is provided with a gauge wheel assembly embodying the principles of the invention;

FIG. 2 is a side elevational view of the tractor-implement combination shown in FIG. 1;

DESCRIPTION OF THE PREFERRED EMBODIMENT

Figure 3:
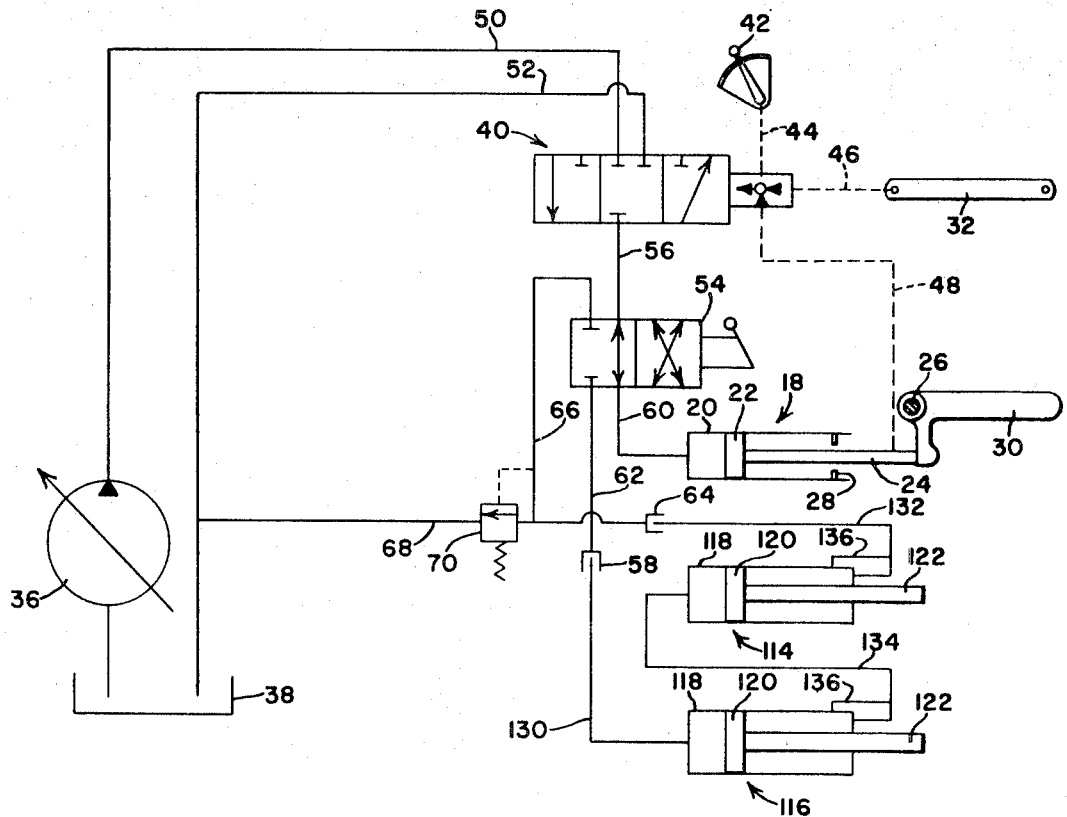
FIG. 3 is a schematic illustration of the hydraulic system embodied in the tractor-implement arrangement illustrated in FIG. 1.

Referring now to the drawings, the gauge wheel assembly according to the present invention is indicated generally at 10 and is illustrated as being mounted on the implement of a tractor-implement combination which is similar to that disclosed and claimed in the copending U.S. application Ser. No. 819,649 filed Apr. 28, 1969. The illustrated tractor is for the most part of conventional construction and includes a main body 12 carried on front steerable wheels (undisclosed) and rear traction wheels 14. The rear portion of the tractor body carries a housing 16 which contains a tractor-mounted hydraulic motor indicated generally at 18. In its basic form, the hydraulic motor 18 includes a cylinder 20 in which a piston 22 travels to transmit force through a piston rod 24 to a tractor-mounted rockshaft 26. A suitable stop 28 is provided on the rod end of the cylinder 20 to limit the outward travel of the piston 22. The rockshaft 26 extends beyond the sides of the housing and has lift arms 30 secured to its opposite ends. The free ends of the lift arms 30 are connected to a pair of lower draft links 32 by drop links 34.

The basic tractor also includes a source of fluid pressure such as a constant pressure variable displacement pump 36, a fluid reservoir 38 and a servocontrol valve indicated generally at 40. As is conventional, the control valve 40 is under the control of three initiating sources, a manual control, a draft responsive control, and a position responsive control. The manual control takes the form of a rockable and selectively setable hand lever 42 which is mounted on a tractor in any suitable manner and connected to the control valve 40 by a suitable linkage represented by the dotted line 44. The draft-responsive control includes the tractor draft links 32 and suitable linkage represented by the dotted line 46 which signals the draft loads imposed upon the links 32 to the control valve 40. The position-responsive control consists of a suitable linkage represented by the dotted line 48 and signals the relative angular position of the rockshaft 26 to the control valve 40. The construction and operation of the control valve 40 and its three initiating sources of control are all conventional and need not be elaborated. However, if necessary, a full understanding of the construction and operation of the same can be had by referring to U.S. Pat. No. 2,864,295 issued Dec. 16, 1958 to W. H. Du Shane.

As can be seen in FIG. 3, one side of the control valve 40 is connected to the pump 36 and the reservoir 38 by fluid lines 50 and 52 respectively. At this point, the illustrated tractor differs from conventional tractors in that the second side of the control valve 40 is not connected directly to the anchor end of the rockshaft cylinder 20, but is connected to a first side of a manually operable selector valve 54 by a fluid line 56. The second side of the selector valve 54 is connected to the anchor end of the cylinder 20 and to a remote cylinder outlet 58 by fluid lines 60 and 62 respectively. The first side of the selector valve 54 is also connected to a remote cylinder outlet 64 by a fluid line 66 to the sump 38 by a fluid line 68. A pressure relief valve 70 is interposed in the fluid line 68 to prevent flow of fluid through the fluid line 68 until the pressure within line 66 exceeds a predetermined value. The selector valve 54 is manually shiftable between a first position in which it connects the hydraulic motor 18 directly with the control valve 40 as illustrated in FIG. 3 and a second position in which it connects the hydraulic motor 18 with the remote cylinder outlet 64 and the control valve 40 with the remote cylinder outlet 58.

The implement illustrated in the drawings includes a center frame indicated generally at 72 and a pair of outrigger frames indicated generally at 74 and 76. The center frame includes front and rear toolbars 78 and 80 to which various earthworking tools such as chisel plows 82 may be secured. Only one chisel plow is illustrated on each frame for simplification purposes. The toolbars 78 and 80 are interconnected at their ends by longitudinally extending side rails 84. The front toolbar 78 carries a pair of spaced hitch pins which extend through the conventional apertured balls carried by the trailing ends of the draft links 32. The forward toolbar 78 also carries an upstanding mast 86 whose upper end pivotally receives the trailing end of a compression link 88 which forms the third member of the tractor three-point hitch. A pair of braces 90 extend between the upper end of the mast 86 and the rear toolbar 80 to reinforce the mast 86. It can be seen from the above that the center frame 72 is completely carried by the tractor three-point hitch consisting of the draft links 32 and compression link 88, and that by extending or retracting the hydraulic motor 18 to rotate the rockshaft 26 the center frame 72 is raised and lowered.

Each of the outrigger frames 74 and 76 includes front and rear toolbars 92 and 94 which carry earthworking tools 82 and which are interconnected at their outer ends by a longitudinally extending rail 96. The outrigger frames 74 and 76 are secured to opposite sides of the center frame 72 for vertical pivotal movement about longitudinally extending axes defined by front and rear pivot bolts 98 and 100 respectively. The outer end of each outrigger frame is adjustably supported by one of the gauge wheel assemblies 10.

Figure 4:
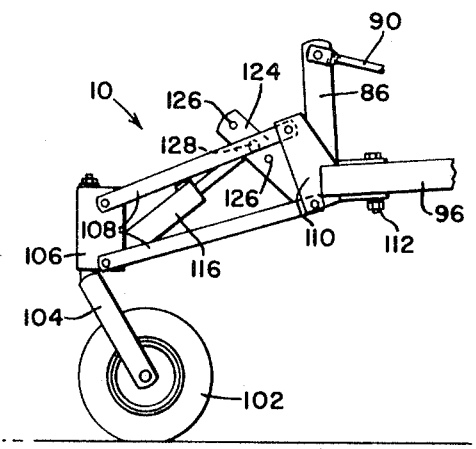
FIG. 4 is a side elevational view of a forward portion of the implement illustrated in FIG. 2, but with the implement being illustrated in a raised position.

Each gauge wheel assembly includes a wheel 102 rotatably carried between the legs of a wheel mounting member or fork member 104 which extends generally downwardly from a generally vertically extending shaft. The vertical shaft is journaled in an elongated hub or sleeve member 106 which is pivotally connected to the forward end of elongated generally longitudinally extending and vertically spaced arms 108. The rearward ends of the arms 108 are pivotally connected in spaced relationship to a mounting bracket 110 which is clamped to the front toolbar 92 by bolts 112. The elongated hub 106, arms 108, and the bracket 110 form a four-bar linkage which permits vertical adjustment of the outrigger frame on the wheel 102. The four-bar linkage positions the wheel 102 well in advance of the implement and in substantially transverse alignment with the rear wheels 14 of the tractor so that all three sections of the implement are supported from substantially transversely aligned points. This will maintain the three frame sections in substantially the same plane as the tractor and implement travel over undulating terrain. As can be seen from FIG. 4, the pivotal connection between the arms 108 and the hub 106 are vertically aligned while the pivotal connection between the upper arm 108 and the mounting bracket 110 is positioned slightly ahead of the pivotal connection between the lower arm 108 and the mounting bracket 110. Also, the lower arm 108 is slightly longer than the upper arm 108 and the arms 108 have a slight convergence to the front. This structure of the four-bar linkage compensates for the forward pitch of a typical tractor hitch geometry when in a raised position to at all times maintain the hub or sleeve member 106 in the vertical position.

The outrigger frames 74 and 76 are raised and lowered on their respective wheels 102 by double-acting hydraulic motors 114 and 116 respectively. Each of the hydraulic motors 114 and 116 consists of a cylinder 118 in which a piston 120 is slidably mounted and has a piston rod 122 extending from side thereof. The cylinders 118 of the hydraulic motors 114 and 116 are pivotally connected to the lower end of the associated hubs 106. As a matter of convenience, each cylinder can be pivotally connected to its associated hub by the same pin which pivotally connects the lower arm 108 to the hub. For the purpose of connecting the rod 122 of each of the motors 114 and 116 to the mounting bracket of the respective wheel assembly, an anchor arm 124 has one end secured to a lower portion of the mounting bracket and extends upwardly and forwardly therefrom. The anchor arm is provided with a plurality of apertures 126 spaced along its length so that the apertures are spaced at various distances, in both the horizontal and vertical directions, from the point of pivotal connection between the mounting bracket and lower arm 108. The rod 122 of each of the motors 114 and 116 is suitably apertured at its outer end for the reception of a removable pivot pin which extends through a selected one of the apertures in the arm 126 and the rod 122. As will be more fully explained hereinafter, the length of the strokes of the motors 114 and 116 needed to vertically adjust the outrigger frames 74 and 76 through a given distance can be varied by varying the points of connection between the anchor arms 124 and the rods 122 of motors 114 and 116.

The hydraulic motors 114 and 116 are connected in series with each other and are also connected to the hydraulic power lift system of the tractor. To this end, the anchor end of the cylinder 118 of motor 116 is connected to the tractor remote cylinder outlet 58 by a fluid line 130. Similarly, the rod end of the cylinder 118 for motor 114 has its rod end connected to the tractor remote cylinder outlet 64 by a fluid line 132. The rod end of the cylinder of motor 116 is also connected to the anchor end of the cylinder of motor 114 by a fluid line 134. The cylinders 118 of the hydraulic motors 114 and 116 are also each provided with a fluid bypass circuit 136 which permits flow of fluid through the cylinder when the motor has been fully extended. The purpose of the bypass circuit 136 will become apparent hereinafter.

In order that the outrigger frames 74 and 76 are raised and lowered through equal vertical distances by their respective gauge wheel assemblies, the linkage of the gauge wheel assemblies are identical and the displacement of the implement mounted cylinders 114 and 116 is so matched that the fluid displaced from the rod end of the cylinder of motor 116 to raise the outrigger frame 76 through a given distance is equal to the fluid needed within the anchor end of the cylinder for the motor 114 to raise the outrigger frames 74 through an equal distance. In order that the outrigger frames 74 and 76 are raised and lowered through the same vertical distance as the center frame 72, the implement mounted hydraulic motors 114 and 116 must be of a size that the fluid displaced from the rod end of the cylinder of motor 114 during the outward stroke of its associated piston 120 to raise the outrigger frame will be equal to the fluid needed within the anchor end of the cylinder 20 of the tractor-mounted hydraulic motor 18 to drive the piston 22 outwardly a distance sufficient to raise the center frame 72 through a vertical distance equal to the distance which the outrigger 74 is raised.

The operation of the above-described tractor and implement combination is briefly as follows: With the center frame 72 of the implement connected to the tractor three-point hitch and the fluid lines 130 and 132 connected to the remote cylinder outlets 58 and 64, the selector valve 54 will be moved to the left to interconnect the tractor-mounted hydraulic motor with the remote cylinder outlet 64 and the control valve 40 moved the remote cylinder outlet 58. With the selector valve 54 moved to the left, the three hydraulic motors are connected in series so that the tractor operator can control all three frames of the implement with the single control lever 42 in the same manner that an integral implement with a single rigid frame is controlled. For example, when the control lever 42 is shifted to move the control valve 40 to its exhaust position, fluid from the anchor end of the cylinder of motor 116 is free to flow to the reservoir 38, fluid from the anchor end of the cylinder of motor 114 is free to flow to the rod end of the cylinder of motor 116, and fluid is free to flow from the anchor end of the cylinder of the tractor-mounted motor 18 to the rod end of the cylinder of motor 114. When the control lever 42 is shifted to move the control valve 40 to the supply position, fluid pressure from the pump 36 is supplied to the anchor end of the cylinder of motor 116, displacing fluid from the rod end of the cylinder of motor 116 to the anchor end of the cylinder of motor 114, which in turn displaces fluid from the rod end of the cylinder of motor 116 to the anchor end of the cylinder of motor 118. Thus, all three motors are operated simultaneously, both in raising and lowering the implement frame. Also, as is conventional and well understood by those skilled in the art, the control valve 40 may also be under the influence of the draft forces exerted by the implement on the draft links 32.

During the outward movement of the pistons during lifting of the implement frames, should any one of the pistons reach the end of its stroke before the other pistons reach the ends of their strokes, fluid will bypass that piston to allow the other pistons to reach the ends of their strokes. For example, should either one of the pistons 120 of the motors 114 and 116 bottom out, continued fluid movement is provided through the bypass circuits 136. Similarly, should the piston 22 of the hydraulic motor 18 bottom out against the stop 28 before the pistons 120 of the hydraulic motors 114 and 116 bottom out, fluid pressure within the line 66 will open the bypass valve 70 and provide for continued fluid movement through the fluid line 68 to the sump 38. Thus, each time the implement frames are fully raised, the hydraulic motors 18, 114 and 116 will be automatically synchronized to compensate for any fluid leakage which may have occurred past any one of the pistons.

Although the foregoing brief description of operation is believed to be sufficient to enable those skilled in the art to understand the operation of the tractor and implement combination, a more detailed description of operation can be had by referring to the previously mentioned copending U.S. application Ser. No. 819,649.

As previously mentioned, in order for the various frames of the implement to be vertically adjusted through equal distances, it is necessary that the fluid displaced from the cylinder of any of the three hydraulic motors for a given vertical adjustment of its associated frame must be equal to the fluid needed within the cylinder of the next adjacent motor for an equal vertical displacement of its associated frame. For a given tractor with a given size hydraulic motor and a single hitch geometry, it is a simple matter to provide the proper gauge wheel assembly linkage and to select the implement mounted hydraulic motors to have the proper displacement. However, as a practical matter, the implement may and will be used on various types and sizes of tractors and the size of the rockshaft cylinders and hitch geometries on the different tractors vary. The gauge wheel assembly according to the invention permits the use of a single-size wheel assembly with various tractor hitch geometries and without the need of using different implement mounted cylinders to compensate for the different sizes of tractor rockshaft cylinders.

To accomplish the use of the implement on various tractors, the size of the hydraulic motor 114 is selected and matched with the largest tractor-mounted motor 18 with which it is intended to be used so that the fluid displaced from the rod end of its cylinder 118 during the total outward stroke of its piston 120 is equal to the fluid needed within the anchor end of the cylinder 20 of the largest tractor-mounted hydraulic motor 18 to force its piston 22 through its total outward stroke. The size of the hydraulic motor 116 is also selected so that the fluid displaced from the rod end of its cylinder 118 during the total outward stroke of its piston 120 is equal to the fluid needed within the anchor end of the cylinder 118 of motor 114 to drive its piston 120 through its total outward stroke. The rods 122 of the hydraulic motors 114 and 116 are then pivotally connected to the outermost aperture 126 in their associated anchor arms 124, the outermost aperture 126 in the anchor arms 124 being positioned such that the total stroke of the motors 114 and 116 will vertically adjust the outrigger frames 74 and 76 through the same distance which the center frame 72 is vertically adjusted by the full stroke of the tractor-mounted motor 18.

The size of the tractor-mounted motor usually decreases as the size of the tractor decreases. If the implement is to be used with a smaller tractor having a smaller hydraulic motor 18, the pivot pins 128 are removed and inserted through a lower aperture 126 so that the connection between the rod ends of the motors 114 and 116 and their respective anchor arms 124 are varied. With the connection moved to a lower aperture, the outrigger frames 74 and 76 can be adjusted through the same distance with less than the total stroke of the motors 114 and 116. However, the strokes required still displace sufficient fluid from the rod ends of the cylinders 118 of the hydraulic motors 114 and 116 to force the tractor-mounted motor 18 through it entire stroke so that all three frames of the implement are vertically adjusted to equal distances. When less than the total stroke of the hydraulic motors 114 and 116 is needed to vertically adjust the outrigger frames through the same vertical distance through which the center frame is adjusted, only the outermost portion of the strokes of the hydraulic motors 114 and 116 is utilized so that all the motors are rephased or synchronized when the implement is fully raised. If the implement is to be used with a tractor having a still smaller hydraulic motor 18, then the pivot pin 128 is moved to the lowermost aperture in the anchor arm 124.

The geometry of the tractor three-point hitch usually varies with the size of the tractor so that a hitch on a small tractor will not raise an implement as high as the hitch on a large tractor. The size of the rockshaft cylinder also decreases as the size of the tractor decreases. By varying the position of connection between the rod ends of motors 114 and 116 and their respective anchor arms 124, it is also possible to compensate for the different hitch geometries. For example, when the pivot pins 128 are removed from the outermost aperture 126 in the anchor arms 124 and inserted through a lower aperture, the motors 114 and 116 will not be able to raise the outrigger frames as high as they did when the rod ends of the motors were connected to the outermost apertures. Thus, the variable connections between the motors and their respective anchor arms compensate for a combination of the tractor hitch geometry and size of the tractor rockshaft cylinder.

While a single preferred embodiment of the invention has been described and illustrated, various modifications within the spirit and scope of the invention will become apparent to those skilled in the art and can be made without departing from the underlying principles of the invention.

We claim:

1. In a tractor-implement combination in which the tractor has a power lift system including pivotally mounted trailing draft links, hydraulic motor means for raising and lowering the draft links, and a source of fluid pressure and a control valve for the motor means, and the implement includes a frame, means connecting the frame to the tractor draft links to be raised and lowered thereby, a plurality of gauge wheel assemblies, means mounting the frame on the wheel assemblies for generally vertical movement, each of the wheel assemblies including an extensible and retractable hydraulic cylinder means operable upon extension and retraction to raise and lower the frame on the wheel assemblies, fluid line means connecting the cylinder means in series, and additional fluid line means connecting the hydraulic cylinder means to the tractor power lift system in series between the control valve and motor means, the improvement comprising: each of the gauge wheel assemblies including a mounting bracket secured to the frame, upper and lower elongated link means having corresponding ends pivotally connected to the mounting bracket at vertically spaced positions, a vertically extending elongated hub member, the opposite ends of the link means being pivotally connected to the hub member at vertically spaced positions, a caster wheel including a shaft journaled in the hub member, the hydraulic cylinder means having one end connected to a lower portion of the hub member, and means for selectively and releasably connecting the opposite end of the cylinder means to the mounting bracket at any one of a plurality of fixed positions which are spaced various distances from the point of connection between the mounting bracket and the lower elongated link means, whereby the tractor power lift system and gauge wheel assemblies will be operated simultaneously to thereby cooperate in raising and lowering the frame, and by varying the point of connection between the cylinder means and mounting bracket, the movement of the frame caused by the wheel assemblies can be made to correspond with the movement of the frame caused by the tractor power lift system.

2. The combination set forth in claim 1 wherein the means for selectively connecting the opposite end of the hydraulic cylinder means to the mounting bracket at various distances from the point of connection between mounting bracket and the lower elongated link means includes an anchor member secured to the mounting bracket and provided with a plurality of apertures spaced at various distances from the point of connection between the mounting bracket and the lower link means, an aperture provided in the opposite end of the cylinder means, and removable pin means extending through a selected one of the apertures provided in the anchor member and through the aperture provided in the opposite end of the cylinder means.

3. The combination set forth in claim 2 wherein the anchor is an elongated arm extending upwardly and outwardly from the mounting bracket toward the hub member, and the apertures provided in the arm are spaced along the length of the arm.

4. In combination with an implement having a frame adapted to be mounted on a tractor having a power-operated hitch including a pair of pivotally mounted trailing draft links, tractor-mounted hydraulic motor means for raising and lowering the draft links, and a source of fluid pressure for the motor means, a gauge wheel assembly comprising: a mounting bracket secured to the frame, a pair of upper and lower link means having corresponding ends pivotally connected to the mounting bracket at vertically spaced locations, a generally vertically extending sleeve member, means pivotally connecting the opposite ends of the link means to the sleeve member at vertically spaced locations, a wheel-mounting member having a shaft journaled in the sleeve member, a wheel rotatably mounted on the lower end of the mounting member, an extensible and retractable hydraulic cylinder means having one end connected to the sleeve member, means selectively connecting the opposite end of the cylinder means to the mounting bracket at any one of a plurality of fixed positions which are spaced various distances from the point of connection between the lower link means and the mounting bracket, fluid line means connected to the opposite ends of the cylinder means and in series between the source and motor means of the tractor whereby the tractor power-operated hitch and gauge wheel assembly will be operated simultaneously to thereby cooperate in raising and lowering the frame and by varying the point of connection between the cylinder means and mounting bracket, the movement of the frame caused by the wheel assembly can be made to correspond with that caused by the tractor power-operated hitch.

5. The combination set forth in claim 4 wherein the mounting bracket, sleeve member and link means form a four-bar-linkage, the one end of the cylinder means is pivotally connected to the sleeve member coaxially with the pivotal connection between the lower link means and sleeve member, and the means pivotally connecting the cylinder means to the mounting bracket includes an arm secured to the mounting bracket and provided with a plurality of apertures spaced at various distances from the pivotal connection between the lower link means and mounting bracket in both the horizontal and vertical directions, an aperture provided in the cylinder means, and removable pin means extending through a selected one of the apertures provided in the arm and the aperture provided in the cylinder means.

6. In a tractor-implement combination in which the tractor has a three-point hitch, hydraulic motor means for raising and lowering the hitch, and a source of fluid pressure and a control valve for the motor means, and the implement includes a series of rigid frames pivotally connected for vertical pivotal movement relative to one another, means integrally connecting one of the frames to the tractor three-point hitch to be raised and lowered thereby, a gauge wheel assembly mounted on and adjustably supporting each of the other frames, and extensible and retractable hydraulic cylinder means associated with each of the wheel assemblies and operable upon extension or retraction to vertically adjust their respective frames on the respective wheel assemblies, fluid line means connecting the cylinder means in series, and additional fluid line means connecting the cylinder means in series between the motor means and the control valve, the improvement comprising: each of the gauge wheel assemblies including a mounting bracket secured to one of the frames; upper and lower rigid link means having corresponding ends pivotally connected to the mounting bracket at horizontally spaced positions; the other ends of the upper and lower rigid link means being pivotally connected to an elongated vertically extending hub member at vertically aligned positions; the upper and lower rigid link means being positioned with respect to each other to converge toward the hub member; the lower link means having a length greater than the upper link means; a wheel-mounting member having a shaft journaled in the hub member; a wheel rotatably mounted on the lower end of the mounting member; the cylinder means being operably connected between the hub member and mounting bracket for vertically adjusting its associated frame upon extension and retraction; and means for selectively mounting the cylinder means at any one of a plurality of fixed positions with respect to the mounting bracket for varying the length of the stroke of the cylinder means needed to vertically adjust the associated frame through a given distance.

7. In a tractor-implement combination in which the tractor has a three-point hitch, hydraulic motor means for raising and lowering the hitch, and a source of fluid pressure and a control valve for motor means, and the implement includes a series of rigid frames pivotally connected for vertical pivotal movement relative to one another, means integrally connecting one of the frames to the tractor three-point hitch to be raised and lowered thereby, a gauge wheel assembly mounted on and adjustably supporting each of the other frames, and extensible and retractably hydraulic cylinder means associated with each of the wheel assemblies and operable upon extension or retraction to vertically adjust their respective frames on the respective wheel assemblies, fluid line means connecting the cylinder means in series, and additional fluid line means connecting the cylinder means in series between the motor means and the control valve, the improvement comprising: each of the gauge wheel assemblies including a mounting bracket secured to one of the frames; an elongated vertically extending hub member; upper and lower rigid link means extending between and pivotally interconnecting the mounting bracket and the hub member; a wheel-mounting member having a shaft journaled in the hub member; a wheel rotatably mounted on the lower end of the mounting member; the cylinder means having one end connected to the hub member; and removable means pivotally connecting the opposite end of the cylinder means to the mounting bracket at any one of a plurality of fixed selected positions spaced at various distances from the point of pivotal connection between the lower link means and the mounting bracket, whereby the motor means and cylinder means will be operated simultaneously to thereby cooperate in vertically adjusting the frames, and by varying the connection between the cylinder means and mounting bracket, the length of the stroke of the cylinder means needed to move the respective frames through a given distance is varied so that the movement of the frames supported by the wheel assemblies can be made to correspond with the movement of the frame supported by the tractor three-point hitch.

8. The combination set forth in claim 7 wherein the mounting bracket, hub member and link means of each wheel assembly form a four-bar linkage, the one end of the cylinder means is pivotally connected to the hub member coaxially with the pivotal connection between the lower link means and the hub member, and the positions for the pivotal connection between the cylinder means and mounting bracket are spaced at various distances from the point of pivotal connection between the lower link means and mounting bracket in both the vertical and horizontal directions.

9. The combination set forth in claim 8 wherein the means pivotally connecting the cylinder means to the mounting bracket includes an anchor arm secured to the mounting bracket and provided with a plurality of apertures spaced along its length, and aperture provided in the cylinder means, and removable pin means extending through a selected one of the apertures in the anchor arm and the aperture provided in the cylinder means.

10. The combination set forth in claim 9 wherein the pivotal connection between the hub member and the upper and lower link means are vertically aligned, the pivotal connections between the mounting bracket and upper and lower link means are offset horizontally, and the lower link means has a length greater than the upper link means.

* * * * *